United States Patent
Wang et al.

(10) Patent No.: US 9,046,411 B2
(45) Date of Patent: Jun. 2, 2015

(54) OPTICAL SENSOR SYSTEM FOR A GAS TURBINE ENGINE AND METHOD OF OPERATING THE SAME

(75) Inventors: Guanghua Wang, Clifton Park, NY (US); Anquan Wang, West Chester, OH (US); Nirm Velumylum Nirmalan, Niskayuna, NY (US); Jordi Estevadeordal, Saratoga Springs, NY (US); Sean Patrick Harper, Mason, OH (US); Bradford Allen Lewandowski, West Chester, OH (US)

(73) Assignee: General Electric Company, Niskayuna, NY (US)

( * ) Notice: Subject to any disclaimer, the term of this patent is extended or adjusted under 35 U.S.C. 154(b) by 827 days.

(21) Appl. No.: 13/295,838

(22) Filed: Nov. 14, 2011

(65) Prior Publication Data

US 2013/0118183 A1  May 16, 2013

(51) Int. Cl.
| | |
|---|---|
| *G01J 5/00* | (2006.01) |
| *F01D 17/08* | (2006.01) |
| *F01D 17/20* | (2006.01) |
| *G01J 5/02* | (2006.01) |
| *G01J 5/60* | (2006.01) |

(52) U.S. Cl.
CPC .............. *G01J 5/0088* (2013.01); *F01D 17/08* (2013.01); *F01D 17/20* (2013.01); *F05D 2270/804* (2013.01); *G01J 5/026* (2013.01); *G01J 5/602* (2013.01)

(58) Field of Classification Search
CPC .............. G01N 21/359; G01N 21/314; G01N 21/3504; G01J 3/36; G01J 5/20; G01J 5/08; G08B 13/191
USPC ................................ 250/338.1, 338.3, 339.01
See application file for complete search history.

(56) References Cited

U.S. PATENT DOCUMENTS

| | | | | |
|---|---|---|---|---|
| 3,874,238 | A | * | 4/1975 | Compton et al. ............. 374/100 |
| 4,306,525 | A | * | 12/1981 | Faxvog ...................... 123/196 S |
| 4,708,474 | A | | 11/1987 | Suarez-Gonzalez |
| 5,203,632 | A | | 4/1993 | Fisher et al. |
| 5,265,036 | A | | 11/1993 | Suarez-Gonzalez et al. |
| 5,300,778 | A | * | 4/1994 | Norkus et al. ........... 250/339.01 |
| 5,822,222 | A | | 10/1998 | Kaplinsky et al. |
| 6,111,511 | A | * | 8/2000 | Sivathanu et al. ............ 340/577 |
| 6,682,216 | B1 | | 1/2004 | Small, IV et al. |
| 6,816,803 | B1 | | 11/2004 | Palfenier et al. |
| 7,633,066 | B2 | | 12/2009 | Antel, Jr. et al. |
| 7,957,926 | B2 | | 6/2011 | Timans |
| 2009/0285259 | A1 | | 11/2009 | Allen et al. |
| 2011/0119019 | A1 | | 5/2011 | Rogers et al. |

* cited by examiner

*Primary Examiner* — Gerald L Sung
(74) *Attorney, Agent, or Firm* — Scott J. Asmus

(57) ABSTRACT

An optical sensor system includes a multi-color pyrometer in optical communication with a component. The pyrometer generates signals at least partially representative of radiation received from the component and from soot particles. The system includes at least one processing unit coupled to the pyrometer. The processing unit is programmed to receive the signals and distinguish portions of radiation received between at least two wavelength bands. The processing unit is also programmed to determine that a first portion of radiation within a first of the wavelength bands is representative of a temperature of soot particles and that a second portion of radiation within a second of the wavelength bands is representative of a temperature of the component. The processing unit is further programmed to filter out signals representative of the first portion of the radiation.

20 Claims, 15 Drawing Sheets

Table Of Calibration Coefficients — 700

| Channel | a | b | c |
|---|---|---|---|
| 1064 nm | 11168.08931 | 10154.20269 | 298.97756 |
| 1600 nm | 8929.19803 | 1967.03451 | 3.34305 |
| 2200 nm | 6504.21361 | 314.04833 | 1.36435 |

FIG. 10

OPTICAL SENSOR SYSTEM FOR A GAS TURBINE ENGINE AND METHOD OF OPERATING THE SAME

STATEMENT REGARDING FEDERALLY SPONSORED RESEARCH & DEVELOPMENT

This invention was made with Government support under contract number HR0011-04-C-0002 awarded by the Defense Advanced Research Projects Agency (DARPA), Defense Sciences Office (DSO). The Government may have certain rights in this invention.

BACKGROUND OF THE INVENTION

The field of the invention relates generally to sensor systems and, more particularly, to optical sensors used with turbomachines.

At least some known turbomachines, such as gas turbine engines, include a plurality of rotating turbine blades or buckets that channel high-temperature fluids through the gas turbine engines. Known turbine buckets are typically coupled to a wheel portion of a rotor within the gas turbine engine and cooperate with the rotor to form a turbine section. The turbine buckets are typically spaced circumferentially in a row extending about the rotor. Moreover, known turbine buckets are arranged in axially-spaced rows that are separated by a plurality of stationary nozzle segments that channel the fluid flowing through the engine towards each subsequent row of rotating buckets. Each row of nozzle segments, in conjunction with an associated row of turbine buckets, is usually referred to as a turbine stage and most known turbine engines include a plurality of turbine stages. The arrangement of turbine buckets and nozzle segments is referred to as a hot gas path.

Such known turbine buckets and nozzle segments in the hot gas path may wear over time. For example, such hot gas path components may exhibit stress-related cracking, such stresses induced by temperatures at or above predetermined parameters. Therefore, many known gas turbine engines include temperature monitoring systems that provide operational temperature data in real time, i.e., at the time of measurement. At least some of these known temperature monitoring systems use optical instruments, e.g., optical pyrometers that generate a voltage output signal representative of the temperatures of the components being monitored. Also, many known gas turbines monitor and record such temperature data as an input to adjust operation, e.g., the firing rate of the gas turbine engine, i.e., the rate and/or ratio of fuel and air being combusted in the engine. In some cases, the temperature data may be used as an input into certain protective features of the engine.

In most known gas turbine engines, soot is a common byproduct of the combustion of hydrocarbon fuels and soot particles may become entrained in the hot gas being channeled through the hot gas path. Such soot particles may have temperatures greater than the components in the hot gas path. The soot particles can contact the optical pyrometers and induce a short burst of voltage signals having an elevated amplitude at the pyrometer output. Many gas turbine engine controllers receive these signals a primary inputs into the associated combustion control features. Therefore, such high voltage signals may be misinterpreted as elevated component temperatures by the combustion control features programmed within the controllers. Specifically, the rate and/or ratio of fuel and air being combusted in the engine may be adjusted due to the erroneous signals. Such conditions may result in an undesired reduction in power production by the turbine and oscillations of power production due to periodic and/or routine soot attachment to, and removal from, the optical pyrometer. Furthermore, the associated temperature indications may be used as an input to the protective features of the gas turbine engine, and an erroneous temperature indication may be significant enough to initiate an unplanned shutdown of the gas turbine engine, i.e., a unit trip.

BRIEF SUMMARY OF THE INVENTION

In one aspect, an optical sensor system is provided. The system includes at least one multi-color pyrometer in optical communication with at least one component. The at least one multi-color pyrometer is configured to generate signals at least partially representative of radiation received from the at least one component and at least partially representative of radiation received from soot particles. The system also includes at least one processing unit coupled to the at least one multi-color pyrometer. The at least one processing unit is programmed to receive the signals generated in the at least one multi-color pyrometer and distinguish portions of radiation received by the at least one multi-color pyrometer between at least two wavelength bands. The at least one processing unit is also programmed to determine that a first portion of radiation within a first of the at least two wavelength bands is representative of a temperature of soot particles and to determine that a second portion of radiation within a second of the at least two wavelength bands is representative of a temperature of the at least one component. The at least one processing unit is further programmed to filter out signals representative of the first portion of the radiation.

In a further aspect, a method for operating a gas turbine engine is provided. The method includes channeling a combustion gas stream through a hot gas path of the gas turbine engine. The combustion gas stream includes soot particles entrained therein. The hot gas path includes at least one turbine component. The method also includes receiving radiative emissions from at least a portion of the soot particles in at least one multi-color pyrometer and receiving radiative emissions from at least one turbine component in the at least one multi-color pyrometer. The method further includes generating signals representative of temperatures of both the soot particles and the at least one turbine component in the at least one multi-color pyrometer and discriminating between a portion of the signals generated by the soot particles and a portion of the signals generated by the at least one turbine component. The method also includes determining a temperature of the at least one turbine component.

In another aspect, a gas turbine engine is provided. The engine includes at least one component positioned within a hot gas path defined within the gas turbine engine. The engine also includes at least one multi-color pyrometer in optical communication with the at least one component. The at least one multi-color pyrometer is configured to generate signals at least partially representative of radiation received from the at least one component and at least partially representative of radiation received from soot particles. The engine further includes at least one processing unit coupled to the at least one multi-color pyrometer. The at least one processing unit is programmed to receive the signals generated in the at least one multi-color pyrometer and distinguish portions of radiation received by the at least one multi-color pyrometer between at least two wavelength bands. The at least one processing unit is also programmed to determine that a first portion of radiation within a first of the at least two wavelength bands is representative of a temperature of soot particles and determine that a second portion of radiation within a second of the at least two wavelength bands is representative of a temperature of the at least one component. The at least one processing unit is further programmed to filter out signals representative of the first portion of the radiation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 10 is a tabular view of a plurality of calibration coefficients that may be used with the optical sensor system shown in FIGS. 3 and 4;

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
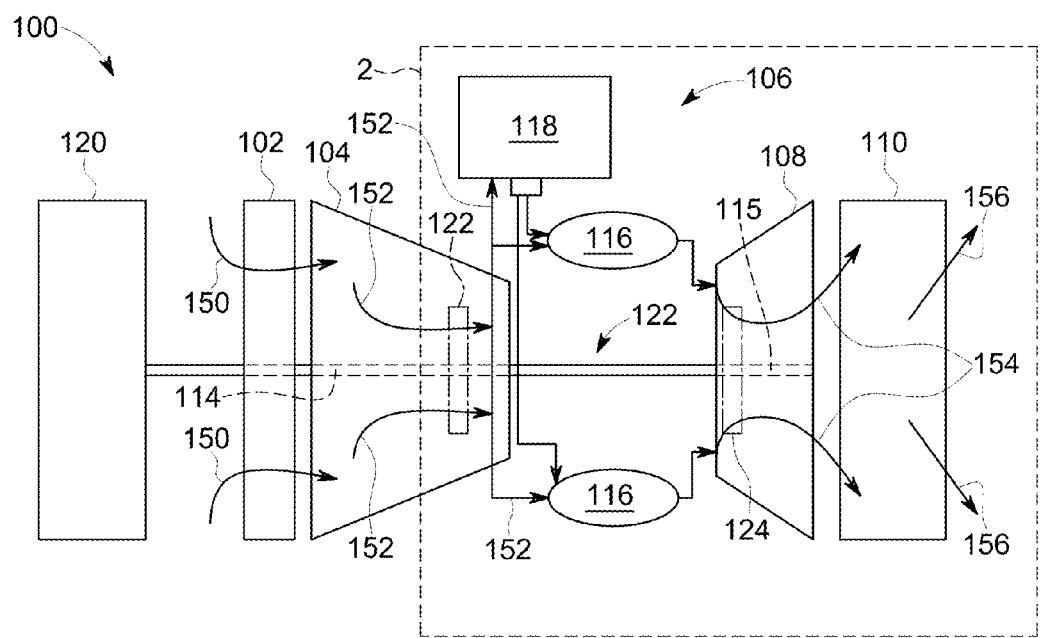
FIG. 1 is schematic diagram of an exemplary gas turbine engine.

FIG. 1 is a schematic view of a rotary machine 100, i.e., a turbomachine, and more specifically, a gas turbine engine 100. In the exemplary embodiment, gas turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with, combustor section 106. Turbine engine 100 includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122. Also, in the exemplary embodiment, turbine section 108 includes at least one turbine blade, i.e., bucket 124. Each compressor blade assembly 122 and each turbine bucket 124 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is mixed with fuel (not shown) and ignited within section 106 to generate combustion gases 154 that are channeled downstream towards turbine section 108. Specifically, at least a portion of compressed air 152 is channeled to fuel nozzle assembly 118. Fuel is also channeled to fuel nozzle assembly 118, wherein the fuel is mixed with compressed air 152 and the mixture is ignited within combustors 116. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
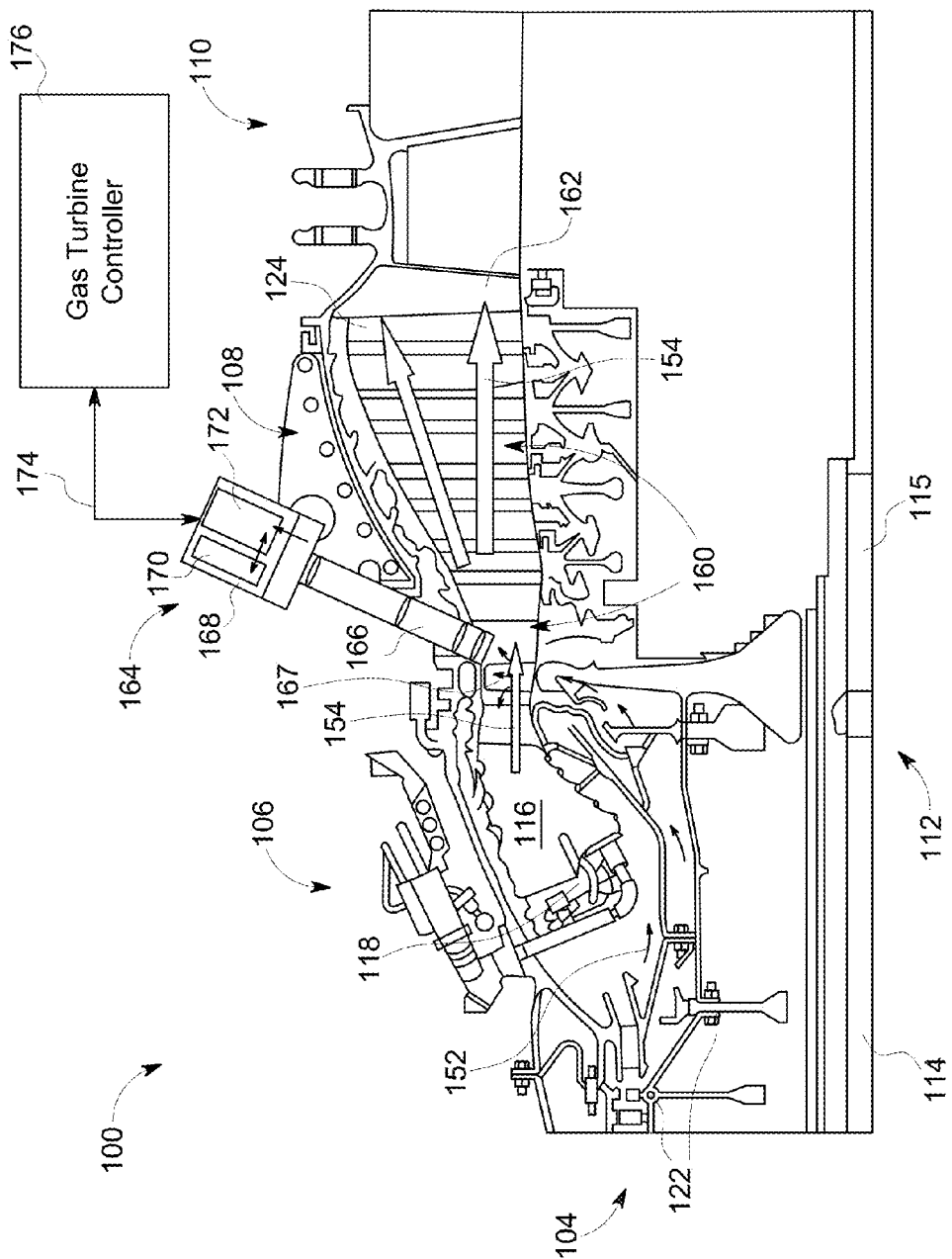
FIG. 2 is enlarged cross-sectional view of a portion of the gas turbine engine shown in FIG. 1 taken along area 2.

FIG. 2 is an enlarged cross-sectional view of a portion of gas turbine engine 100 taken along area 2 (shown in FIG. 1). Turbine section 108 includes a hot gas path 160 at least partially defined by turbine buckets 124. Turbine section 108 also includes a plurality of stationary blades, i.e., vanes 162 that further define hot gas path 160. Gas turbine engine 100 includes an optical sensor system 164 that includes at least one multi-color pyrometer 166 (only one shown) extending into a portion of hot gas path 160. In the exemplary embodiment, multi-color pyrometer 166 is directed toward, and in optical communication with, a portion of hot gas path 160 defined by a first stage turbine bucket, i.e., a stage one bucket (S1B) 167 in the vicinity of the coupling of combustors 116 to turbine section 108. Alternatively, multi-color pyrometer 166 is directed toward any portion of hot gas path 160 that enables operation of optical sensor system 164 as described herein.

Multi-color pyrometer 166 receives photons (not shown in FIG. 2) emitted from objects within its optical sensing range having wavelengths that are in a broad wavelength band, e.g., without limitation, 400 nanometers (nm) (0.4 micrometers (µm)) to 10,000 nm (10 µm). Also, multi-color pyrometer 166 includes a plurality of detectors (not shown in FIG. 2), wherein each detector is calibrated for a predetermined wavelength band. Some embodiments of multi-color pyrometer 166 include at least one Indium Gallium Arsenide (InGaAs) detector calibrated for a wavelength band centered at approximately 1,064 nm (1.064 µm). Also, some embodiments of multi-color pyrometer 166 include at least one InGaAs detector calibrated for a wavelength band centered at approximately 1,600 nm (1.6 µm). Further, some embodiments of multi-color pyrometer 166 include at least one extended range InGaAs detector calibrated for a wavelength band centered at approximately 2,200 nm (2.2 µm). Therefore, optical sensor system 164 is configured to split a broad wavelength band radiation signal of a gas turbine hot gas path component into multiple narrow wavelength bands.

Optical sensor system 164 also includes a processing unit 168 coupled to multi-color pyrometer 166. Processing unit 168 includes at least one processor 170 and a memory device 172 coupled to processor 170 and at least one input/output (I/O) conduit 174, wherein conduit 174 includes at least one I/O channel (not shown). In the exemplary embodiment, multi-color pyrometer 166 and processing unit 168 form an integrated, unitary "smart pyrometer architecture" that executes all algorithms and control logic and generates and transmits all data output that enables optical sensor system 164 to operate as described herein. Alternatively, processing unit 168 may be a separate unit positioned remotely from multi-color pyrometer 166.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 170 and other processors (not shown) as described herein process information transmitted from a plurality of electrical and electronic devices that include, without limitation, multi-color pyrometer 166. Memory devices 172 and storage devices (not shown) store and transfer information and instructions to be executed by processor 170. Memory devices 172 and the storage devices can also be used to store and provide temporary variables, static (i.e., non-volatile and non-changing) information and instructions, or other intermediate information to processor 170 during execution of instructions by processor 170. Instructions that are executed include, but are not limited to, analysis of signals transmitted from multi-color pyrometer 166. The execution of sequences of instructions is not limited to any specific combination of hardware circuitry and software instructions.

In the exemplary embodiment, gas turbine engine 100 includes a gas turbine controller 176 coupled to processing unit 168 through I/O conduit 174. In the exemplary embodiment, gas turbine controller 176 is fundamentally a standard package, such as, without limitation, a gas turbine digital engine control (GT DEC) system and/or a prognosis and health monitoring (PHM) system. Gas turbine controller 176 includes sufficient memory and processing resources to enable operation of gas turbine engine 100 as described herein, wherein such memory and processing resources are described above. As described above, multi-color pyrometer 166 and processing unit 168 form an integrated, unitary architecture that executes all algorithms and control logic and generates and transmits all data output to gas turbine controller 176. Therefore, in the exemplary embodiment, only minor modifications to the architecture and programming of gas turbine controller 176 to accommodate processing unit 168 and data transmitted therefrom are necessary. Alternatively, gas turbine controller 176 may include the architecture and programming necessary to execute the functions of processing unit 168, thereby rendering processing unit 168 unnecessary.

In operation, temperature measurements of S1B 167 generated within multi-color pyrometer 166 and processing unit 168 are transmitted to gas turbine controller 176 through I/O conduit 174. S1B 167 is typically the component in hot gas path 160 that will experience the highest temperatures because it is one of the first components to be exposed to exhaust gases 156 channeled from combustors 116. Therefore, gas turbine controller 176 includes sufficient programming to use temperature measurements of S1B 167 as one primary measurement of the operation of gas turbine engine 100. Moreover, gas turbine controller 176 includes sufficient programming to use temperature measurements of S1B 167 to control the firing rate, i.e., the rate and ratio of fuel and air combustion within combustors 116. Further, gas turbine controller 176 includes sufficient programming to use temperature measurements of S1B 167 to initiate protective functions within gas turbine engine 100 to reduce a potential for damage to gas turbine engine 100 in the event of a significant temperature excursion.

Figure 3:
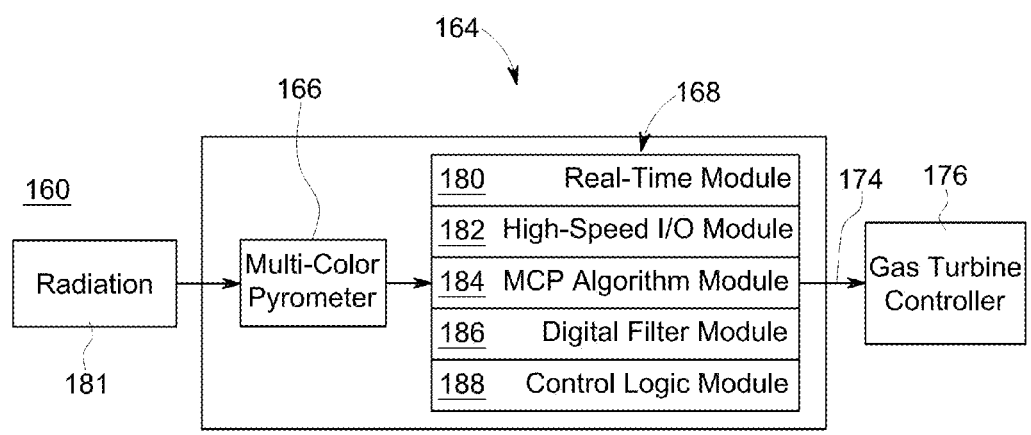
FIG. 3 is a schematic diagram of an exemplary architecture of an optical sensor system that may be used with the gas turbine engine shown in FIGS. 1 and 2.

FIG. 3 is a schematic diagram of an exemplary architecture of optical sensor system 164 that may be used with gas turbine engine 100 (shown in FIGS. 1 and 2). As described above, processing unit 168 includes processor 170 and memory device 172 (both shown in FIG. 2). In the exemplary embodiment, processing unit 168 of optical sensor system 164 includes a real-time module 180 that includes sufficient system clocking hardware, software, and/or firmware to facilitate executing the programmed functionality of optical sensor system 164 at predetermined processing speeds of at least one megaHertz (1 MHz). As used herein, the term "real-time" refers to high-speed processing of measurements of radiation 181 with negligible temporal latencies, i.e., substantially at the time of measurement. Also, as used herein, the term "high-speed" refers to processing frequencies of 1 MHz or greater. In the exemplary embodiment, processing unit 168 includes at least one high-speed I/O module 182 that includes a plurality of ports (not shown) coupled to a plurality of I/O channels (not shown) in I/O conduit 174. I/O module 182 facilitates high-speed transmission of temperature signal inputs from multi-color pyrometer 166 and high-speed transmission of temperature signal outputs to gas turbine controller 176. Processing unit 168 further includes a multi-color pyrometry (MCP) algorithm module 184, a digital filter module 186, and a control logic module 188. The functionality of modules 184, 186, and 188 are described below. Modules 180, 182, 184, 186, and 188 are communicatively coupled.

Figure 4:
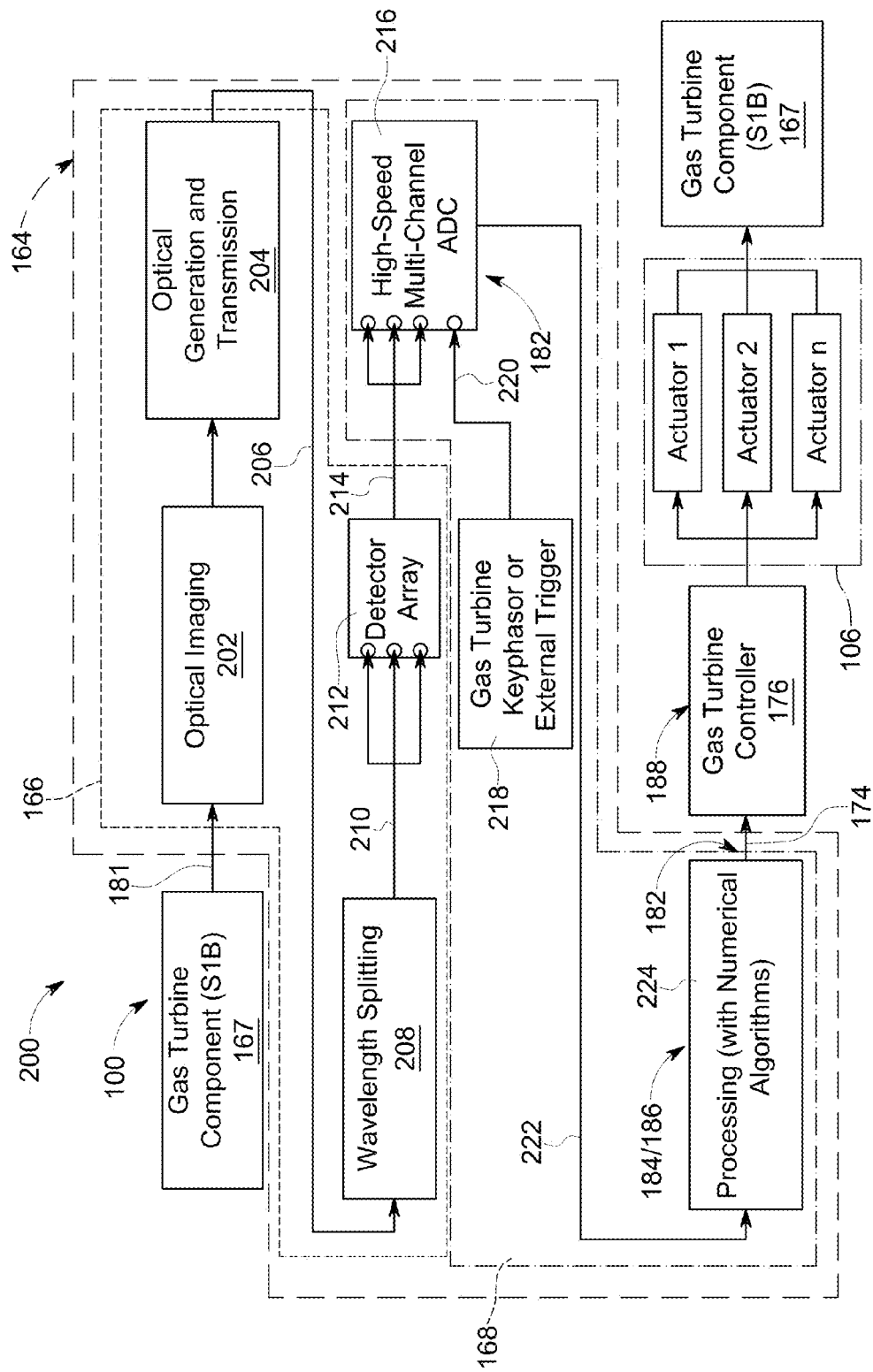
FIG. 4 is a flow chart of the functional logic of the optical sensor system shown in FIG. 3.
Figure 5:
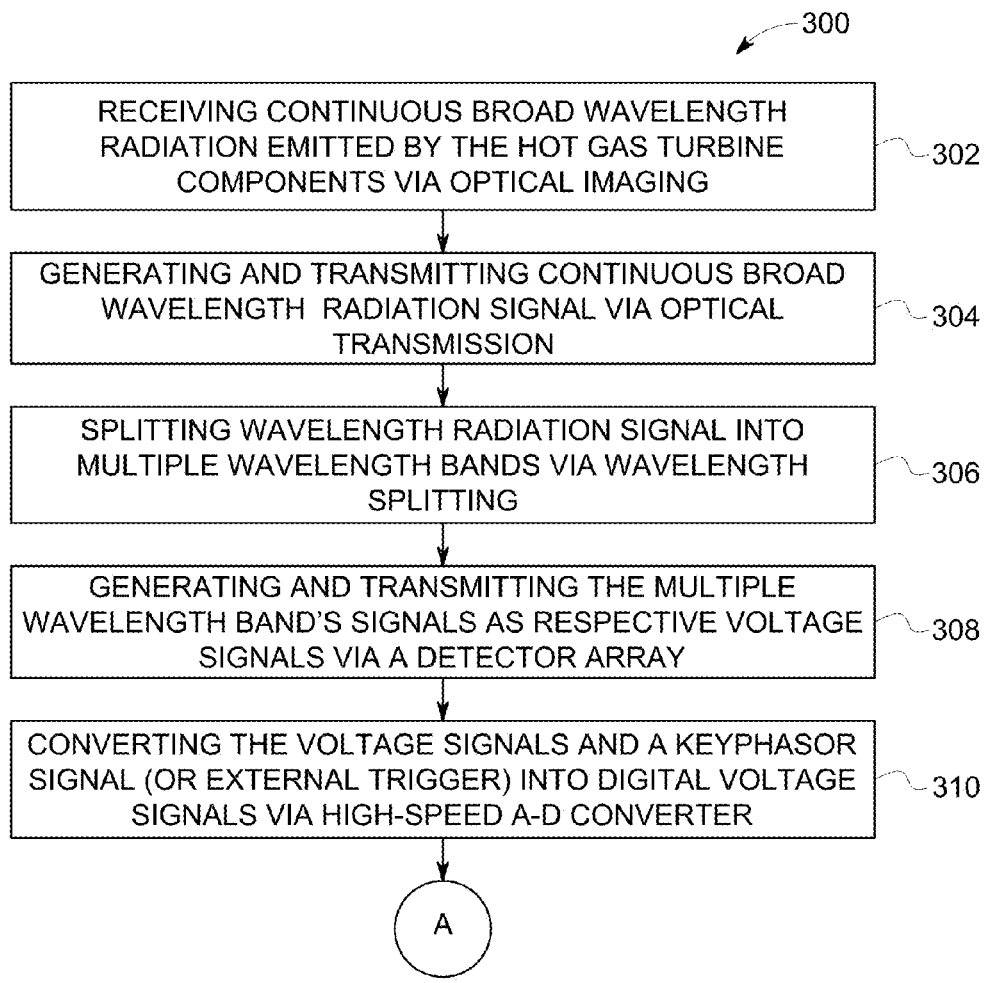
FIG. 5 is a flow chart that describes the execution of the functions shown in FIG. 4.
Figure 6:
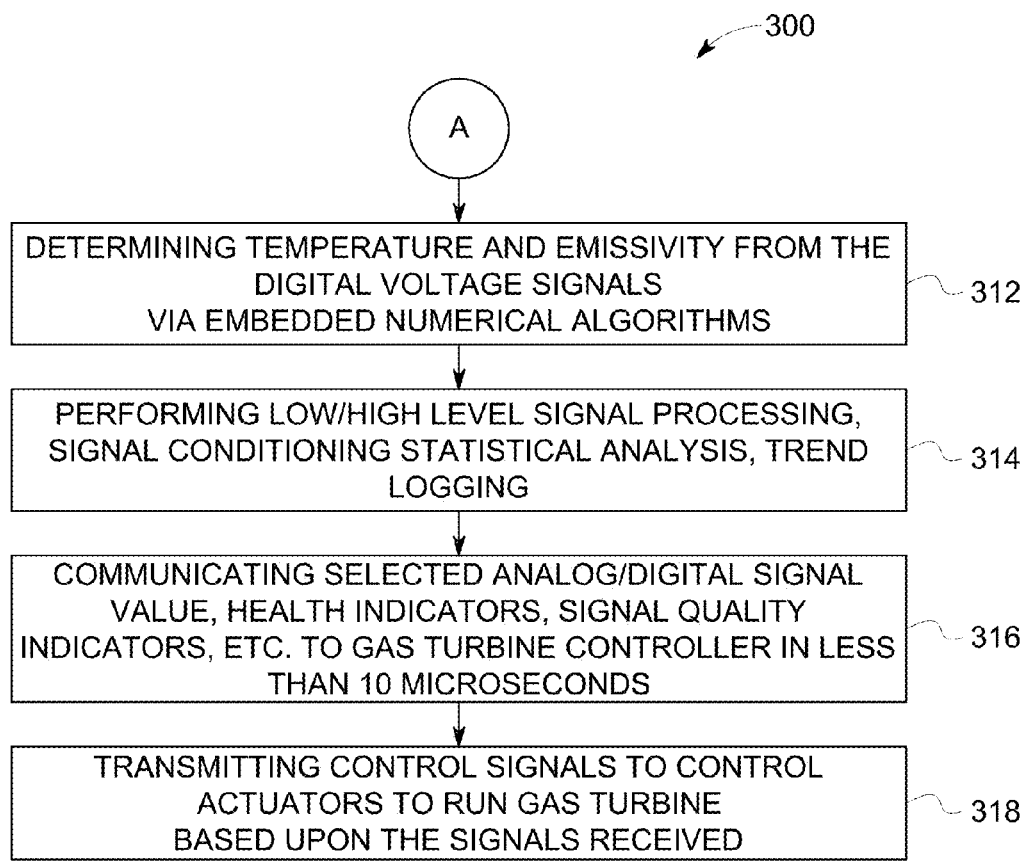
FIG. 6 is a continuation of the flow chart shown in FIG. 5.

FIG. 4 is a flow chart 200 of the functional logic of optical sensor system 164 as used with gas turbine engine 100. In general, the functionality of optical sensor system 164 and the components therein are shown as a plurality of stringed function blocks. Optical sensor system 164 includes the necessary hardware, architecture, programming, and processing resources, including, without limitation, software and firmware to execute the functionality associated with the function blocks. FIG. 5 is a flow chart 300 that describes the execution of the functions shown in FIG. 4. FIG. 6 is a continuation of flow chart 300 shown in FIG. 5. FIGS. 4 and 5 are referenced together. In the exemplary embodiment, radiation 181, in the form of a continuous stream of photons emitted from objects within the optical sensing range of multi-color pyrometer 166 having wavelengths within a broad wavelength band, e.g., 400 nm (0.4 μm) to 10,000 nm (10 μm), is received 302 by pyrometer 166. Multi-color pyrometer 166 defines an optical imaging function block 202 that executes the functionality associated with receipt of radiation 181 therein.

Multi-color pyrometer 166 also defines an optical generation and transmission function block 204 that executes the functionality associated with generating 304 and transmitting a continuous broad wavelength radiation signal 206 representative of the broadband wavelengths of radiation 181 as received therein.

Further, multi-color pyrometer 166 defines a wavelength splitting function block 208 that executes the functionality associated with splitting 306 continuous broad wavelength radiation signal 206 into a plurality of predetermined wavelength bands.

Figure 7:
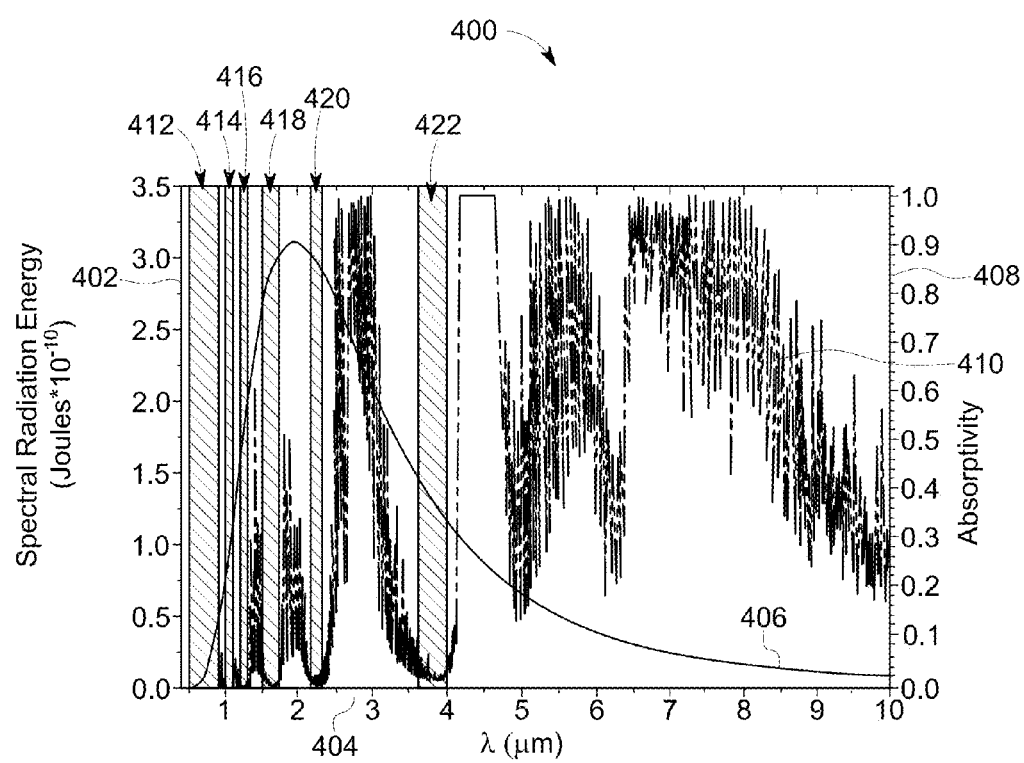
FIG. 7 is a graphical view of a plurality of absorption/emission free detection bands that may be used with the optical sensor system shown in FIGS. 3 and 4.

FIG. 7 is a graph 400 of a plurality of absorption/emission free detection bands that may be used with optical sensor system 164 (shown in FIGS. 3 and 4). Graph 400 includes a left hand side (LHS) y-axis 402 representative of a spectral radiation energy in units of $10^{-10}$ joules emitted from S1B 167 calculated from Planck's Law using a temperature of approximately 1,500 degrees Kelvin (° K) (1,237 degrees Celsius (° C.) and 2,259 degrees Fahrenheit (° F.)). LHS y-axis 402 is graduated in energy increments of 0.25 extending from 0.0 to $3.5*10^{-10}$ joules. Graph 400 also includes an x-axis 404 representative of the wavelength (λ) spectrum extending from 400 nm (0.4 μm) to 10,000 nm (10 μm), graduated in increments of 0.5 μm. Graph 400 further includes a radiation flux curve 406, wherein the radiation flux is distributed as a function of radiation wavelength (λ).

Graph 400 includes a right hand side (RHS) y-axis 408 representative of unitless absorptivity coefficients for general combustion products within combustion gases 154 (shown in FIGS. 1 and 2) generated as a result of combustion of hydrocarbon fuels, e.g., water and carbon dioxide, under typical running conditions for gas turbine engine 100 (shown in FIGS. 1 and 2). RHS y-axis 408 is graduated in increments of 0.02 extending from 0.0 to 1.0. Graph 400 further includes an absorptivity coefficient curve 410, wherein the absorptivity is distributed as a function of radiation wavelength (λ).

Optical sensor system 164 (shown in FIGS. 3 and 4) generates the predetermined results for those wavelength ranges having values associated with absorptivity coefficient curve 410 of approximately zero. Such low-absorptivity wavelength ranges are referred to as absorption-free detection windows. In the exemplary embodiment, six absorption/emission-free detection windows are available for use with multi-color pyrometry (MCP) measurements by optical sensor system 164 as described herein. Specifically, a first detection window 412 extends from approximately 0.5 μm to approximately 0.9 μm, wherein silicon (Si) detectors are typically used. A second detection window 414 extends from approximately 1.0 μm to approximately 1.1 μm. A third detection window 416 extends from approximately 1.2 μm to approximately 1.3 μm. A fourth detection window extends 418 from approximately 1.5 μm to approximately 1.7 μm. InGaAs detectors and Lead Sulfur (PbS) detectors are typically used for second, third, and fourth detections window 414, 416, and 418, respectively. A fifth detection window 420 extends from approximately 2.1 μm to approximately 2.3 μm, wherein extended-InGaAs and extended-PbS detectors are typically used. A sixth detection window 422 extends from approximately 3.6 μm to approximately 4.0 μm. Typically, Indium Antimonide (InSb), Lead Selenide (PbSe), Platinum Silicide (PtSi), and Mercury Cadmium Telluride (HgCdTe) detectors are used for sixth window 422.

Therefore, in the exemplary embodiment, a plurality of the six detection windows are used. Specifically, second, fourth, and fifth detection windows 414, 418, and 420, respectively, are used. As described above, multi-color pyrometer 166 (shown in FIGS. 3 and 4) includes a plurality of detectors (not shown in FIGS. 3 and 4), wherein each detector is calibrated for a predetermined wavelength band. Some embodiments of multi-color pyrometer 166 include at least one InGaAs detector calibrated for a wavelength band centered at approximately 1064 nm (1.064 μm), i.e., within second detection window 414. Also, some embodiments of multi-color pyrometer 166 include at least one InGaAs detector calibrated for a wavelength band centered at approximately 1600 nm (1.6 μm), i.e., within fourth detection window 418. Further, some embodiments of multi-color pyrometer 166 include at least one extended range InGaAs detector calibrated for a wavelength band centered at approximately 2200 nm (2.2 μm), i.e., within fifth detection window 420.

While specific wavelength bands are described for the exemplary embodiment, alternative embodiments may have different wavelength bands selected depending upon such factors as, without limitation, the type and quality of fuel being combusted, and thermodynamic conditions in the hot gas path, e.g., temperatures and pressures.

Referring again to FIGS. 4 and 5, wavelength splitting function block 208 executes the functionality associated with splitting 306 continuous broad wavelength radiation signal 206 into a plurality of split wavelength signals 210 representative of radiation in the predetermined wavelength bands, i.e., bands centered about approximately 1,064 nm, 1,600 nm, and 2,200 nm. Split wavelength signals 210 are transmitted to a detector array 212.

In the exemplary embodiment, detector array 212 includes at least one InGaAs detector that measures radiation having wavelengths within second detection window 414 centered at approximately 1064 nm (1.064 μm). Also, detector array 212 includes at least one InGaAs detector that measures radiation having wavelengths within fourth detection window 418 centered at approximately 1600 nm (1.6 μm). Further, detector array 212 includes at least one extended range InGaAs detector that measures radiation having wavelengths within fifth detection window 420 centered at approximately 2200 nm (2.2 μm) (all shown in FIG. 7). Alternative embodiments of detector array 212 and optical sensor system 164 include any number of detectors calibrated for any wavelength range that enables operation of system 164 as described herein.

Detector array 212 receives split wavelength signals 210 and generates 308 and transmits analog voltage signals 214 having amplitudes at least partially representative of measured temperatures within the multiple wavelength bands, i.e., bands centered about approximately 1,064 nm, 1,600 nm, and 2,200 nm.

Optical sensor system 164 includes a high-speed, multi-channel analog-to-digital (A-D) converter 216 coupled with detector array 212. Optical sensor system 164 also includes a keyphasor/trigger injection device 218 coupled to A-D converter 216. As used herein, the term "keyphasor" is used to represent an electric pulse, or trigger, which is derived from a point (not shown) on rotating shaft 115 (shown in FIGS. 1 and 2). As the point rotates past a stationary device (not shown) in turbine section 108 (shown in FIGS. 1 and 2), a trigger signal 220 is transmitted to A-D converter 216 to induce a pulsed analog signal conversion to a digital signal. In the exemplary embodiment, the frequency of the keyphasor trigger signal is equivalent to blade frequency, i.e., the speed of shaft 115. Alternatively, trigger signal 220 may be generated by any external triggering device that enables operation of A-D converter 216 and optical sensor system 164 as described herein. A-D converter 216 and keyphasor/trigger injection device 218 are positioned in processing unit 8 and are associated with high-speed I/O processing module 182. In operation, A-D converter 216 converts 310 analog voltage signals 214 and keyphasor/trigger signal 220 into digital voltage signals 222. In the exemplary embodiment, A-D converter 216 is configured to generate digital voltage signals 222 with amplitudes in a range extending from 0 volts to 10 volts. Alternatively, any A-D converter that generates voltage signals with amplitudes in any range that enables operation of optical sensor system 164 is used.

Figure 8:
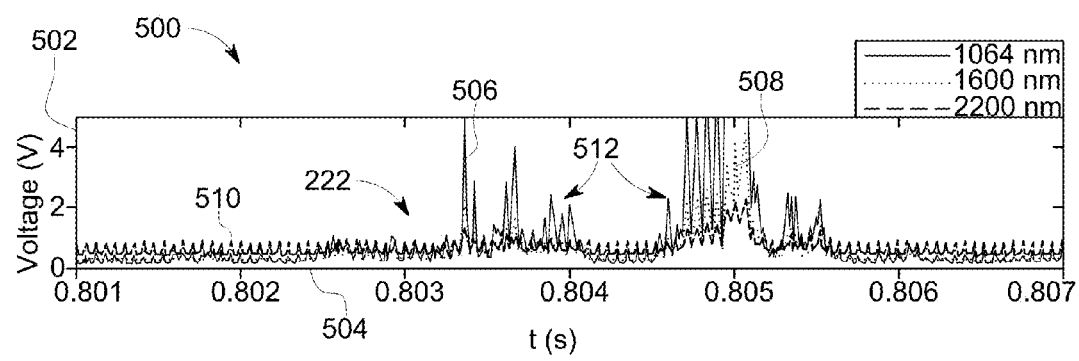
FIG. 8 is a graphical view of a plurality of digital voltage signals generated by the optical sensor system shown in FIGS. 3 and 4.

FIG. 8 is a graph 500 of a plurality of digital voltage signals 222 generated by A-D converter 216 (shown in FIG. 4) in optical sensor system 164 (shown in FIGS. 3 and 4). Graph 500 includes a y-axis 502 representative of a voltage amplitude of signals 222 in units of volts. Y-axis 502 is graduated into increments of 2 volts and extends from 0 volts to 4 volts. Graph 500 also includes an x-axis 504 representative of time in units of seconds. X-axis 504 is graduated into increments of 0.001 seconds and extends from 0.801 seconds to 0.807 seconds. Graph 500 further includes a digital voltage curve 506 representative of a portion of digital voltage signals 222 in the wavelength band defined by approximately 1,064 nm at the center of the band, i.e., second detection window 414 (shown in FIG. 7). Graph 500 also includes a digital voltage curve 508 representative of a portion of digital voltage signals 222 in the wavelength band defined by approximately 1,600 nm at the center of the band, i.e., third detection window 416 (shown in FIG. 7). Graph 500 further includes a digital voltage curve 510 representative of a portion of digital voltage signals 222 in the wavelength band defined by approximately 2,200 nm at the center of the band, i.e., fifth detection window 420 (shown in FIG. 7).

In the exemplary embodiment, digital voltage curve 506 includes a plurality of spikes, or bursts 512 that are induced by soot particles (not shown) generated during the combustion of fuel and air in combustors 116 under some limited operating conditions. The radiation received from the soot particles is at least partially representative of the temperature of the particles, i.e., typically approximately 1,649° C. (3,000° F., 1922° K). Alternative embodiments of gas turbine engine 100 may produce soot particles having different temperatures. These hot soot particulates generate a burst of high voltage signals in optical sensor system 164, most notably, in the 1,064 nm detection band. Some bursts 512 generate voltage signals with amplitudes that exceed the 10 volt upper detection parameter for A-D converter 216, thereby saturating converter 216.

Also, in the exemplary embodiment, digital voltage curves 508 and 510 are typically representative of the radiation received from hot gas components, e.g., S1B 167 (shown in FIGS. 2 and 4). The radiation received from S1B 167 is at least partially representative of the temperature of S1B 167, typically approximately 927° C. (1700° F., 1,200° K). Alternative embodiments of gas turbine engine 100 may produce different temperatures. Therefore, as shown in curves 508 and 510, the temperature of S1B 167 is relatively constant with the exception of indicated apparent temperature transients at bursts 512. In general, signals at shorter wavelength bands have greater amplitudes than corresponding signals in longer wavelength bands at the times of bursts 512. Moreover, the calculated radiant temperatures for each channel associated with a wavelength band also vary significantly at the times of bursts 512. Furthermore, typically, measured radiant temperatures at shorter wavelength bands are greater than those in longer wavelength bands at the times of bursts 512.

Referring again to FIGS. 4 and 6, digital voltage signals 222 are transmitted from A-D converter 216 to a processing function block 224. In the exemplary embodiment, processing function block 224 determines 312 temperature and emissivity from digital voltage signals 222 via embedded numerical algorithms. Specifically, processing function block 224 executes real-time processing of digital voltage signals 222 to determine an apparent emissivity and temperature of S1B 167. The functionality of processing function block 224 extends through multi-color pyrometry (MCP) algorithm module 184 and digital filter module 186.

Figure 9:
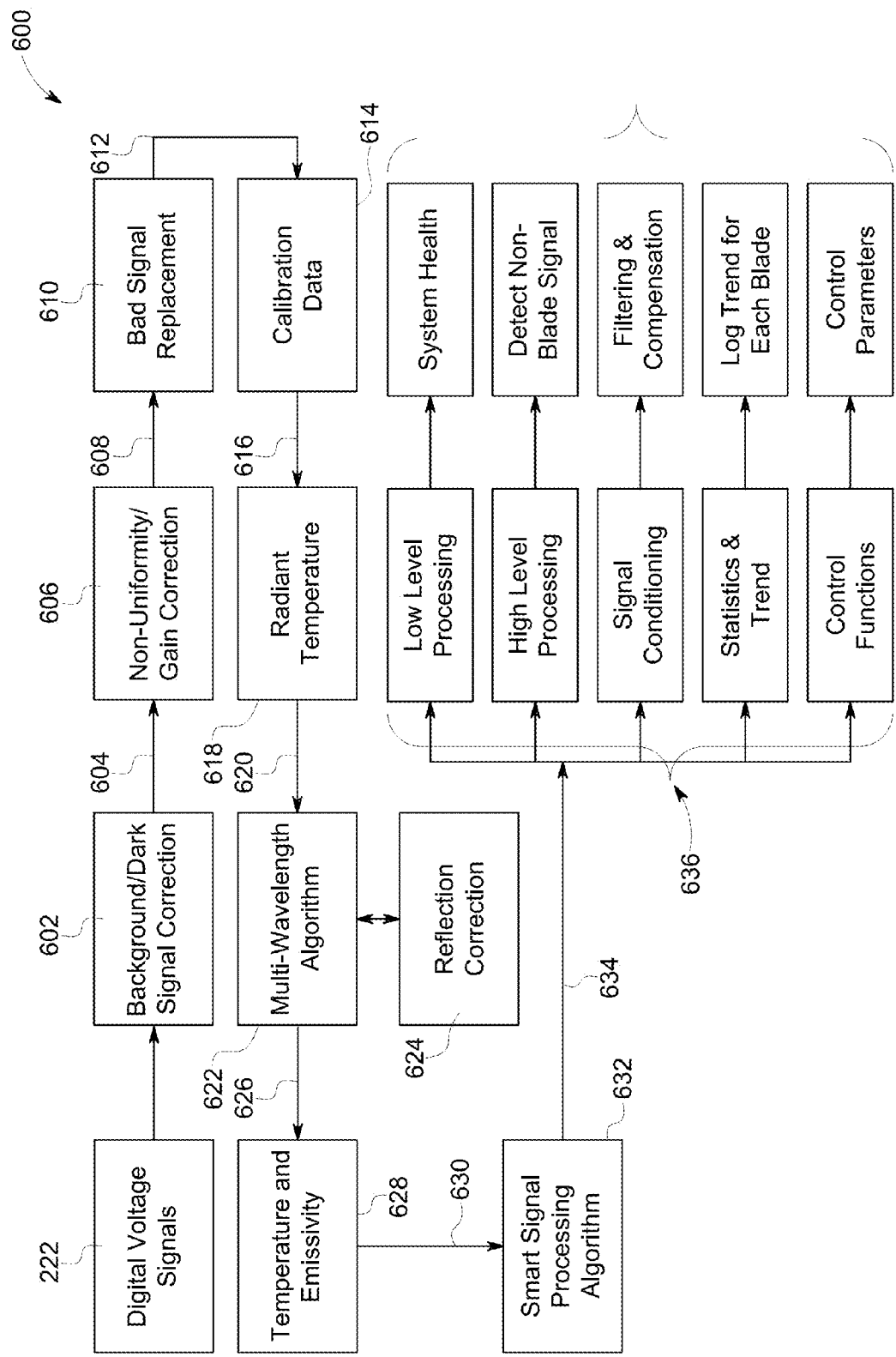
FIG. 9 is a flow chart of the logic programmed in the optical sensor system shown in FIGS. 3 and 4.

FIG. 9 is a flow chart 600 of the logic programmed in MCP algorithm module 184 (shown in FIGS. 3 and 4) to execute the functionality of processing function block 224 (shown in FIG. 4). In the exemplary embodiment, digital voltage signals 222 are transmitted to MCP algorithm module 184. Specifically, digital voltage signals 222 are transmitted to a background/dark signal correction function block 602.

Background noise and dark signals are typically inherent in pyrometers and other spectrometers. For example, at approximately 0° C. (32° F.), there will be a dark current of about 1 electron per pixel per second due to electrons freed from their potential well by their own kinetic energy rather than by the energy of a photon incident to the pyrometer. Both background noise signals and dark current signals may be empirically measured and extracted. Accordingly, function block 602 includes sufficient functionality to determine values for a portion of signals 222 induced by dark signals and other background electronic noise within optical sensor system 164. These values are subtracted from signals 222 to enhance the signal-to-noise ratio within optical sensor system 164 to generate partially-corrected digital voltage signals 604.

Partially-corrected digital voltage signals 604 are transmitted to a non-uniformity/gain correction function block 606. Function block 606 includes sufficient functionality to determine a correction factor for partially-corrected digital voltage signals 604 that may require gain corrections for predetermined spatial variations and/or predetermined imaging non-uniformities associated with each multi-color pyrometer 166. Resultant further-corrected digital voltage signals 608 facilitate accurate energy discrimination, and therefore wavelength discrimination, within optical sensor system 164.

Further-corrected digital voltage signals 608 are transmitted to a bad signal replacement function block 610. Function block 610 includes sufficient functionality to determine those voltage signals that may be missing or significantly varying from adjacent signals such that a replacement signal representing an average of a predetermined number of preceding signals is generated. Function block 610 transmits fully-corrected digital voltage signals 612. Fully-corrected digital voltage signals 612 are transmitted to a calibration curves function block 614. Function block 614 includes sufficient functionality to determine and/or store a plurality of curve-fitting coefficients.

FIG. 10 is a table 700 of a plurality of temperature calibration coefficients that may be used with optical sensor system 164 (shown in FIGS. 3 and 4). Fully-corrected digital voltage signals 612 (shown in FIG. 9) for each of the three channels associated with the 1,064 nm, 1,600 nm, and 2,200 nm wavelength bands, respectively, have a set of three coefficients. Specifically, each wavelength channel includes an "a" coefficient, a "b" coefficient, and a "c" coefficient, that, in the exemplary embodiment, are based on recorded empirical data. Such empirical data is dependent upon such factors as, without limitation, the materials and configuration of S1B 167 (shown in FIGS. 2 and 4) and the type and quality of fuel being combusted.

Referring again to FIG. 9, function block 614 includes sufficient functionality to determine and/or store a plurality of curve-fitting temperature coefficients as shown in FIG. 10. A plurality of signals 616 are transmitted from function block 614 to a radiant temperature function block 618. Signals 616 include the temperature coefficients and fully-corrected digital voltage signals 612. Function block 618 includes sufficient functionality to determine radiant temperature values using the data values in signals 616 and the following algorithm:

$$T_R = a / \{[\ln(b/V)] + c\}, \quad \text{Equation 1}$$

wherein, a, b, and c represent the temperature coefficient values stored in function block 614 as determined using the coefficient values from table 700 in FIG. 10, V represents the voltage values in the appropriate wavelength channel transmitted in signals 616, and $T_R$ represents the determined radiant temperature.

Figure 11:
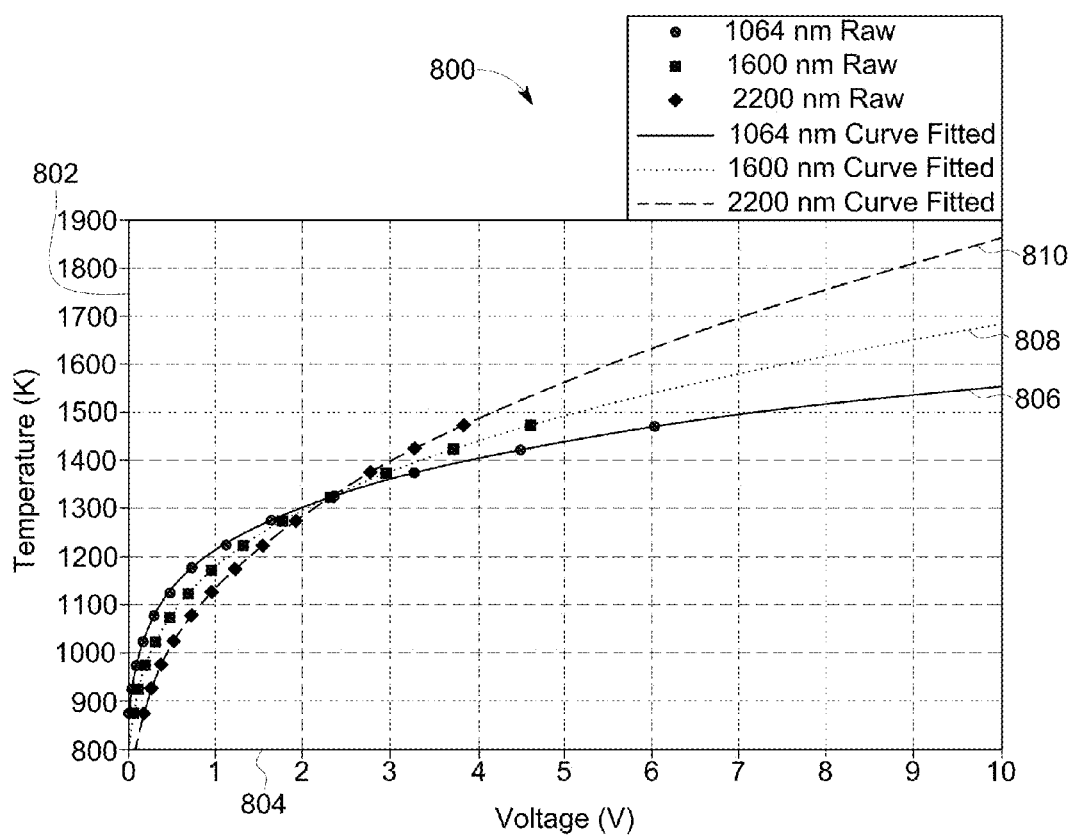
FIG. 11 is a graphical view of a plurality of calibration curves that may be used with the optical sensor system shown in FIGS. 3 and 4.

FIG. 11 is a graph 800 of a plurality of temperature curves that may be used with optical sensor system 164 (shown in FIGS. 3 and 4). Graph 800 includes a y-axis 802 representing temperatures in units of °K. Y-axis 802 is graduated in increments of 100° K and extends from 800° K to 1,900° K. Graph 800 also includes an x-axis 804 representing the amplitudes of fully-corrected digital voltage signals 612 (shown in FIG. 9) in units of volts. X-axis 804 is graduated in increments of 1 volt and extends from 0 volts to 10 volts.

Graph 800 further includes a plurality of curves derived using Equation 1, the coefficient values from Table 700 in FIG. 10, and fully-corrected digital voltage signals 612 (shown in FIG. 9). Specifically, graph 800 further includes a temperature curve 806 representative of temperature values as a function of fully-corrected digital voltage signals 612. Temperature curve 806 is derived from a portion of fully-corrected digital voltage signals in a channel dedicated to the wavelength band defined by approximately 1,064 nm at the center of the band, i.e., second detection window 414 (shown in FIG. 7).

Graph 800 also includes a temperature curve 808 representative of temperature values as a function of fully-corrected digital voltage signals 612. Temperature curve 808 is derived from a portion of fully-corrected digital voltage signals 612 in a channel dedicated to the wavelength band defined by approximately 1,600 nm at the center of the band, i.e., third detection window 416 (shown in FIG. 7).

Graph 800 further includes a temperature curve 810 representative of temperature values as a function of fully-corrected digital voltage signals 612. Temperature curve 810 is derived from a portion of fully-corrected digital voltage signals 612 in a channel dedicated to the wavelength band defined by approximately 2,200 nm at the center of the band, i.e., fifth detection window 420 (shown in FIG. 7).

In the exemplary embodiment, curves 806, 808, and 810 are curve-fitted through data points generated using Equation 1 above. Such data is dependent upon factors such as, without limitation, the materials and configuration of S1B 167 (shown in FIGS. 2 and 4) and the type and quality of fuel being combusted.

Referring again to FIG. 9, radiant temperature function block 618 includes sufficient functionality to determine radiant temperature values using the data values in signals 616 using Equation 1 above. Radiant temperature signals 620 are generated, and transmitted from, radiant temperature function block 618 to a multi-wavelength algorithm function block 622. Radiant temperature signals 620 are representative of radiant temperature values determined for each of the three wavelength bands, i.e., 1,064 nm, 1,600 nm, and 2,200 nm. Function block 622 includes sufficient functionality to store the following algorithms:

$$T = \Delta\lambda / \{[\lambda_2/(T_R)_1] - [\lambda_1/(T_R)_2]\}, \quad \text{Equation 2}$$

$$\mathrm{Ln}(\epsilon) = [c_2/\Delta\lambda] * \{[1/(T_R)_1] - [1/(T_R)_2]\}, \quad \text{Equation 3}$$

wherein, T represents a multi-color pyrometry (MCP) temperature, Equations 2 and 3 are two-color pyrometry algorithms, $T_R$ represents the determined radiant temperature for each of the two wavelengths used as described above, $\lambda_1$ represents the value of the first wavelength, $\lambda_2$ represents the value of the second wavelength, $\Delta\lambda$ represents values of $\lambda_2 - \lambda_1$, and $c_2$ represents a constant value of $1.4388*10^{-2}$ meters-° Kelvin (m-° K).

In the exemplary embodiment, two-color pyrometry algorithms, i.e., Equations 2 and 3, are used rather than three-color pyrometry algorithms to simplify the discussion of the principles involved. Three-color pyrometry determinations use equations and principles similar to those described herein for two-color pyrometry algorithms. The most significant difference between the three-color pyrometry algorithm and the two-color pyrometry algorithm is that the three-color algorithm results in a least-squares algorithm, while the two-color pyrometry algorithm is a fully constrained algorithm, i.e., two equations with two unknowns (temperature and emissivity). Any combination of two and/or three of wavelengths 1,064 nm, 1,600 nm, and 2,200 nm is used that enables operation of optical sensor system 164 as described herein.

As used herein, the emissivity ($\epsilon$) of a material is the relative ability of its surface to emit energy by radiation. It is the ratio of energy radiated by a particular material to energy radiated by a black body at the same temperature. For example, a true black body would have an $\epsilon=1$ while any real object would have an $\epsilon<1$. Emissivity is a dimensionless quantity. In general, the duller and blacker a material is, the closer its emissivity is to 1, and the more reflective a material is, the lower its emissivity.

Continuing to refer to FIG. 9, multi-wavelength algorithm function block 622 is coupled to a reflection correction function block 624. As determined herein, the emissivity values calculated from Equation 3 are not the actual blade surface emissivities of S1B 167. Rather, the emissivity values determined from Equation 3 include effects from both emission from the blade surface of S1B 167 and temperature reflections from surrounding hot surfaces. Considering such reflection effects, the calculated emissivity using Equation 3 is generally higher than the actual emissivities and the determined emissivities may be greater than 1. Therefore, reflection correction function block 624 includes correction factors to reduce the effects of such temperature reflections. As determined empirically, actual emissivities of S1B 167 are typically in a range between approximately 0.37 and approximately 0.52. Such empirical determinations are dependent upon factors such as, without limitation, the materials and configuration of S1B 167.

Signals 626 are transmitted from multi-wavelength algorithm function block 622 to a temperature and emissivity function block 628. Such signals 626 include fully-corrected digital voltage signals 612, Equations 2 and 3, the reflection corrections, and all supporting values and constants as described herein.

Temperature and emissivity function block 628 includes sufficient functionality to determine temperature values and apparent emissivity values of S1B 167 as described above. In addition, function block 628 includes sufficient functionality to discriminate between soot particles and S1B 167.

Figure 12:
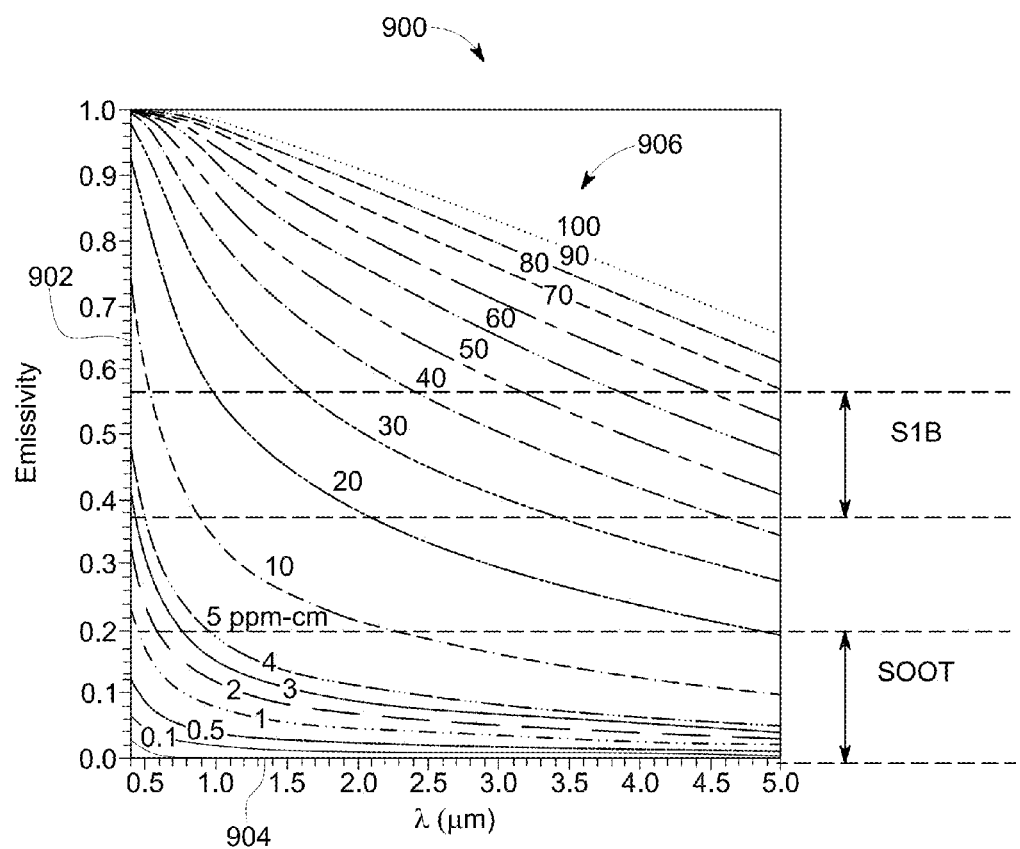
FIG. 12 is a graphical view of a plurality of spectral emissivity curves of soot that may be used with the optical sensor system shown in FIGS. 3 and 4.

FIG. 12 is graph 900 of a plurality of spectral emissivity curves of soot that may be used with optical sensor system 164 (shown in FIGS. 3 and 4). Graph 900 includes a y-axis 902 representative of an emissivity of soot. Y-axis 902 is graduated into unitless increments of 0.02 and extends from 0.0 to 1.0. Graph 900 also includes an x-axis 904 representative of the wavelength (λ) spectrum extending from 400 nm (0.4 μm) to 10,000 nm (10 μm), graduated in increments of 0.1 μm. Graph 900 further includes a plurality of spectral emissivity curves 906 for soot. In the exemplary embodiment, curves 906 are represented as a function of volume fraction ($f_V$) in units of parts per million (ppm) and layer thickness (L) in units of centimeters (cm). Here, the curves are calculated for a range of $f_V L$ extending from 0.1 ppm-cm to 100 ppm-cm.

As shown in graph 900, in a wavelength range between approximately 0.4 μm and approximately 5.0 μm, soot spectral emissivity depends on wavelength. For example, values of soot spectral emissivity monotonically decrease as a function of increasing wavelength, approach values approaching that of black-bodies, i.e., emissivity approaches unity, at shorter wavelengths with large $f_V L$ values, i.e., $f_V L$ values greater than approximately 40 ppm-cm, and for smaller $f_V L$ values, i.e., $f_V L$ values less than approximately 5 ppm-cm, emissivity decays rapidly at an exponential rate at lower wavelengths and further decay approximately linearly at longer wavelengths. Moreover, for lower values of $f_V L$, i.e., less than approximately 5 ppm-cm, the effective soot emissivity is lower than approximately 0.2 for wavelengths greater than approximately 1.0 μm. Also, for higher values of $f_V L$, i.e., greater than 100 ppm-cm), the effective soot emissivity approximates a linear function for wavelengths greater than approximately 1.0 μm.

Figure 13:
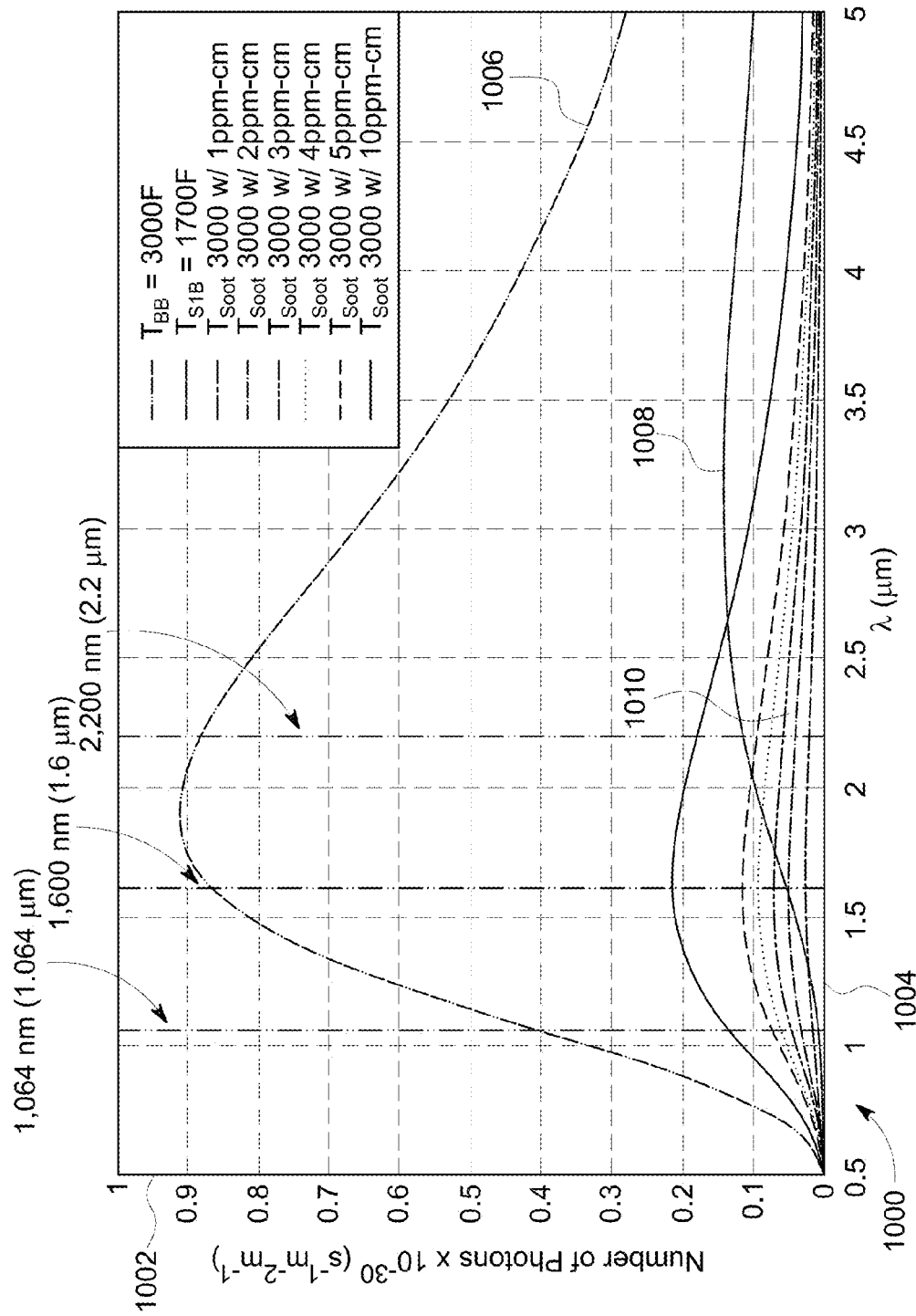
FIG. 13 is a graphical view of a comparison of black body, soot, and blade photon fluxes that may be used with the optical sensor system shown in FIGS. 3 and 4.

FIG. 13 is a graph 1000 of a comparison of black body, soot, and blade photon fluxes that may be used with optical sensor system 164 (shown in FIGS. 3 and 4). Graph 1000 includes a y-axis 1002 representative of photon flux per unit distance in units of photons per sec per square meter per meter (photons/sec-m$^2$-m) times $10^{-30}$. Y-axis 1002 is graduated into increments of 0.1 and extends from 0.0 to 1.0. Graph 1000 also includes an x-axis 1004 representative of the wavelength (λ) spectrum extending from 500 nm (0.5 μm) to 5,000 nm (5 μm), graduated in increments of 0.5 μm.

Graph 1000 further includes a curve 1006 representative of a spectral photon flux as a function of wavelength for a black body at 1,649° C. (3,000° F., 1,376° K), such temperature approximately that of a typical combustor 116 (shown in FIGS. 1 and 2). Graph 1000 also includes a curve 1008 representative of a spectral photon flux as a function of wavelength for a black body at 927° C. (1700° F., 1,200° K), such temperature approximately that of a typical S1B 167 (shown in FIGS. 2 and 4). Graph 1000 further includes a plurality of curves 1010 representative of spectral photon fluxes as a function of wavelength for soot having values of volume fraction and layer thickness ($f_V L$) in units of ppm-cm. Here, the curves are calculated for a values of $f_V L$ including 1 ppm-cm, 2 ppm-cm, 3 ppm-cm, 4 ppm-cm, 5 ppm-cm, and 10 ppm-cm soot radiation signals at 1,649° C. (3,000° F., 1,376° K).

Graph 1000 shows that for values of $f_V L$ greater than 1 ppm-cm, the soot signals in curves 1010 dominate for wavelengths below 1.0 μm. Graph 1000 also shows that for values of $f_V L$ in curve 1010 approximately equal to 5 ppm-cm, the soot signal is approximately equal to the signal for S1B 167 in curve 1008 for wavelengths at approximately 2.0 μm. Graph 1000 further shows that for values of $f_V L$ less than 10 ppm-cm, the soot signal is much less than the SiB 167 signals for wavelengths greater than 5.0 μm.

Therefore, the following general conclusions may be drawn from graph 1000. For those values of wavelengths less than or equal to approximately 2.0 μm, for example, 1,064 nm (1.064 μm) and 1,600 nm (1.6 μm), signals from hot soot particles at approximately 1,649° C. (3,000° F., 1,376° K) are greater than signals for S1B 167 at approximately 927° C. (1700° F., 1,200° K). Also, for those values of wavelengths greater than approximately 2.0 μm, for example, 2,200 nm (2.2 μm), signals from hot soot particles at approximately 1,649° C. (3,000° F., 1,376° K) are less than signals for S1B 167 at approximately 927° C. (1700° F., 1,200° K).

Referring to FIGS. 12 and 13 together, S1B 167 has an actual emissivity in a range between approximately 0.37 and approximately 0.52. For those blades having a thermal barrier coating (TBC), the lower emissivity value may be as low as 0.3 For the lower bands of wavelengths used in optical sensor system 164, and lower values of volume fraction and layer thickness ($f_V L$) for soot, as would be expected in gas turbine engine 100 (shown in FIGS. 1 and 2), the emissivity values for soot at 1,649° C. (3,000° F., 1,376° K) is less than or equal to approximately 0.2. Therefore, there is an emissivity margin under the above conditions that is used in optical sensor system 164. The emissivity value of 0.2 is selected to show the distinguishing characteristics between S1B 167 and soot. Alternatively, selection of emissivity may be flexible and dependent upon factors that include, without limitation, turbine operating conditions, fuel selection, and soot components.

Referring again to FIG. 9, temperature and emissivity function block 628 includes the functionality to use an apparent emissivity filtering algorithm to distinguish between signals generated by S1B 167 at approximately 927° C. (1700° F., 1,200° K) and soot particles at approximately 1,649° C. (3,000° F., 1,376° K). Some unique features of soot particles facilitate use of the apparent emissivity filtering algorithm including, without limitation, lower effective emissivity values for lower soot volume fractions, non-linear effective emissivity behavior for lower soot volume fractions, and soot temperatures being much higher than S1B 167 temperatures.

In the exemplary embodiment, optical sensor system 164, and specifically, temperature and emissivity function block 628 is programmed with an apparent emissivity value of 0.4. This value is based on empirical data collection and a lower emissivity value of 0.37 for S1B 167. Therefore, any signals 626 representative of apparent emissivity values less than 0.4 will be filtered out. Alternatively, any value of the apparent emissivity filter than enables operation of optical sensor system 164 as described herein is used.

Figure 14:
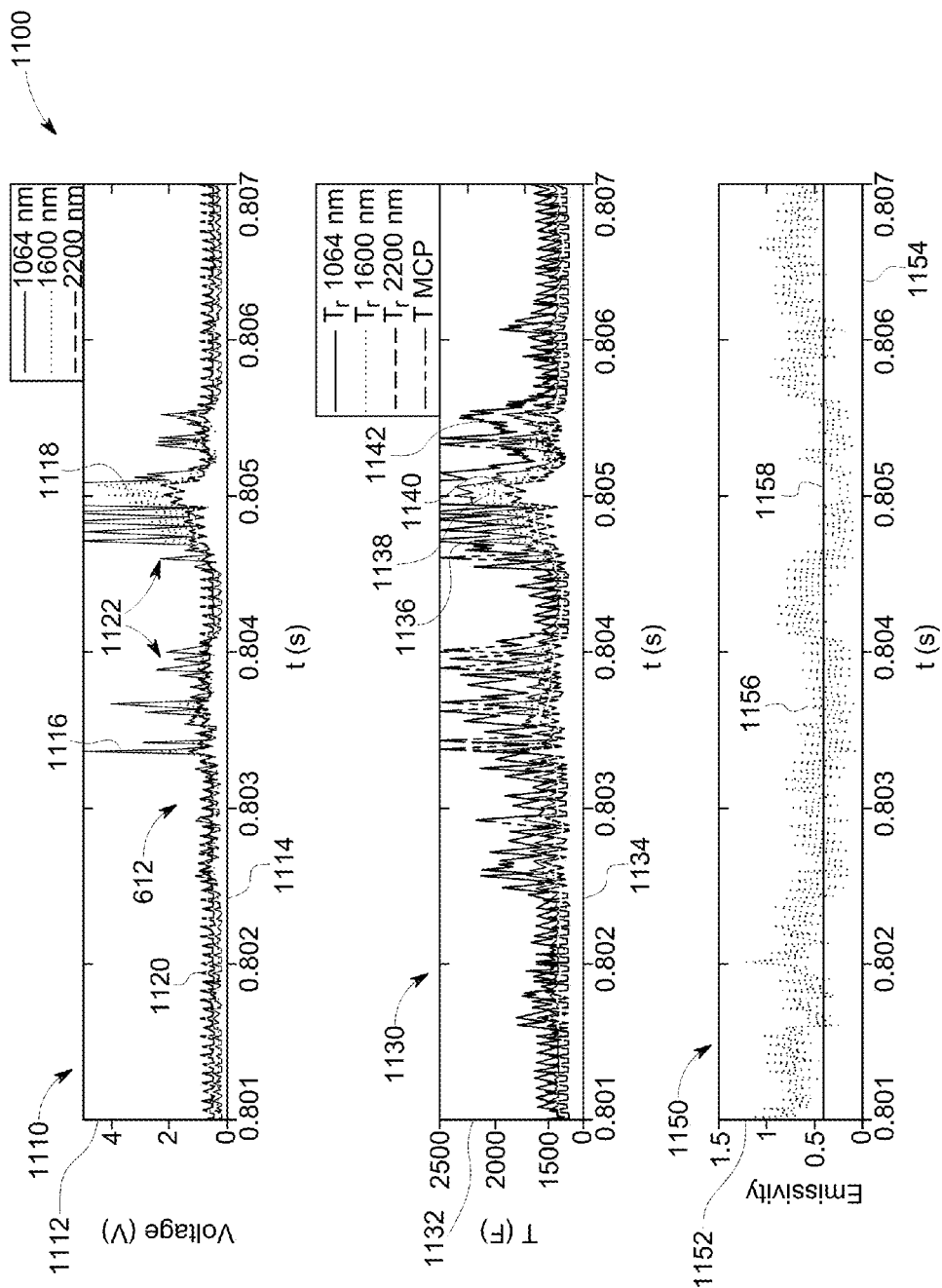
FIG. 14 is a graphical view of soot filtering operation of the optical sensor system shown in FIGS. 3 and 4.

FIG. 14 is a plurality of graphs 1100 showing soot filtering operation of optical sensor system 164 (shown in FIGS. 3 and 4). Graph 1110 includes fully-corrected digital voltage signals 612 (shown in FIG. 9). Graph 1110 includes a y-axis 1112 representative of a voltage amplitude of signals 612 in units of volts. Y-axis 1112 is graduated into increments of 2 volts and extends from 0 volts to 4 volts. Graph 1110 also includes an x-axis 1114 representative of time in units of seconds. X-axis 1114 is graduated into increments of 0.001 seconds and extends from 0.801 seconds to 0.807 seconds. Graph 1110 further includes a digital voltage curve 1116 representative of a portion of digital voltage signals 612 in the wavelength band defined by approximately 1,064 nm at the center of the band, i.e., second detection window 414 (shown in FIG. 7). Graph 1110 also includes a digital voltage curve 1118 representative of a portion of digital voltage signals 612 in the wavelength band defined by approximately 1,600 nm at the center of the band, i.e., third detection window 416 (shown in FIG. 7). Graph 1110 further includes a digital voltage curve 1120 representative of a portion of digital voltage signals 612 in the wavelength band defined by approximately 2,200 nm at the center of the band, i.e., fifth detection window 420 (shown in FIG. 7).

In the exemplary embodiment, digital voltage curve 1116 includes a plurality of spikes, or bursts 1122 that are induced by soot particles generated during the combustion of fuel and air in combustors 116 (shown in FIG. 2) under some limited operating conditions. The radiation received from the soot particles is proportional to the temperature of the particles, i.e., typically approximately 1,649° C. (3,000° F., 1922° K). These hot soot particulates generate a burst of high voltage signals in optical sensor system 164, most notably, in the 1,064 nm detection band.

Also, in the exemplary embodiment, digital voltage curves 1118 and 1120 are typically representative of the radiation received from hot gas components, e.g., S1B 167 (shown in FIGS. 2 and 4). The radiation received from S1B 167 is proportional to the temperature of S1B 167, typically approximately 927° C. (1700° F., 1,200° K). Therefore, as shown in curves 1118 and 1120, the temperature of S1B 167 is relatively constant with the exception of a small temperature transients at bursts 1122. In general, signals at shorter wavelength bands are higher than corresponding signals of longer wavelength bands at the times of bursts 1122. Moreover, the calculated radiant temperatures for each channel associated with a wavelength band also vary significantly within zones of bursts 1122. Furthermore, typically, radiant temperatures at shorter wavelength bands are higher than those of longer wavelength bands at the times of bursts 1122.

Graph 1130 includes a y-axis 1132 representative of a temperature in units of ° F. Y-axis 1132 is graduated into increments of 500° F. and extends from approximately 1,250° F. to 2,500° F. Graph 1130 also includes an x-axis 1134 that is substantially similar to x-axis 1104. Graph 1130 further includes a radiant temperature curve 1136 representative of a portion of digital voltage signals 612 in the wavelength band defined by approximately 1,064 nm determined using Equation 1 above. Graph 1130 also includes a radiant temperature curve 1138 representative of a portion of digital voltage signals 612 in the wavelength band defined by approximately 1,600 nm determined using Equation 1 above. Graph 1130 further includes a radiant temperature curve 1140 representative of a portion of digital voltage signals 612 in the wavelength band defined by approximately 2,200 nm determined using Equation 1 above. Graph 1130 also includes a multi-color pyrometry (MCP) temperature curve 1142 determined using Equation 2 above. Therefore, optical sensor system 164 generates MCP temperature signals 1142 that are similar to bursts 1122. Curves 1136, 1138, and 1140 indicate decreasing temperature signals with increasing wavelength, such indications facilitating identification of bursts 1122 as due to soot particles.

Graph 1150 includes a y-axis 1152 representative of an emissivity. Y-axis 1152 is graduated into increments of 0.5 and extends from approximately 0 to 1.5. Graph 1150 also includes an x-axis 1154 that is substantially similar to x-axis 1104. Graph 1150 further includes an apparent emissivity curve 1156 determined using Equation 3 above. Graph 1150 also includes a filter line 1158 at a value of approximately 0.4. Therefore, temperature signals in the lower wavelength bands will be selectively filtered out and the temperature signals in the higher wavelength bands will be selectively passed through during those periods when the apparent emissivity if less than 0.4. As such, a significant portion of bursts 1122 are filtered from further transmission into gas turbine controller 176 (shown in FIG. 2).

Referring again to FIG. 9, temperature and emissivity function block 628 generates and transmits filtered voltage signals 630.

Figure 15:
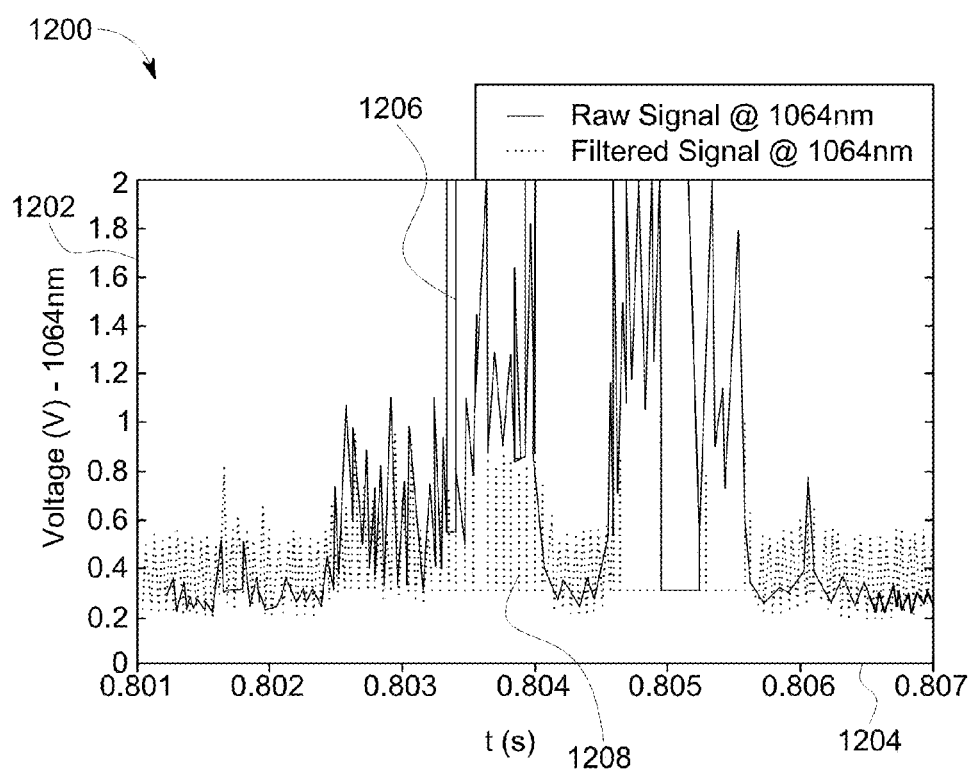
FIG. 15 is a graphical view of a plurality of digital voltage signals generated by the optical sensor system shown in FIGS. 3 and 4.

FIG. 15 is a graph 1200 of a plurality of filtered voltage signals generated by optical sensor system 164 (shown in FIGS. 3 and 4). Graph 1200 includes filter voltage signals 630 (shown in FIG. 9). Graph 1200 includes a y-axis 1202 representative of a voltage amplitude of signals 630 in units of volts. Y-axis 1200 is graduated into increments of 0.2 volts and extends from 0 volts to 2 volts. Graph 1200 also includes an x-axis 1204 representative of time in units of seconds. X-axis 1204 is graduated into increments of 0.001 seconds and extends from 0.801 seconds to 0.807 seconds. Graph 1110 further includes a curve 1206 representing a portion of fully-corrected digital voltage signals 612 (shown in FIG. 9) in the wavelength band defined by approximately 1,064 nm at the center of the band, i.e., second detection window 414 (shown in FIG. 7). Graph 1200 also includes a curve 1208 representative of a portion of filtered voltage signals 630 in the wavelength band defined by approximately 1,064 nm. Some embodiments of optical sensor system 164 include additional algorithms to detect the burst signals and replace them by the last good averaged voltage signal. Also, some embodiments of system 164 include additional filtering to further prepare signals 630 for transmission to certain components and systems, including those that are not configured to receive 1 MHz signals, e.g., signals 630. In the exemplary embodiment, monitoring of hot gas path temperatures is unaffected when there are no soot particle-induced bursts.

Referring again to FIGS. 4, 6, and 9, processing function block 224 (only shown in FIG. 4) includes additional functionality to execute the logic and numerical algorithms. Specifically, a smart signal processing algorithm function block 632 (only shown in FIG. 9) generates and transmits smart signals 634. Smart signals 634 are transmitted to a plurality of function blocks 636 to perform 314 data management and analysis including, without limitation, low and/or high level signal processing, signal conditioning, statistical analysis, and trend logging. In addition, such data management and analysis includes communicating 316 selected analog/digital signal value, health indicators, signal quality indicators, to gas turbine controller 176 in less than 10 microseconds.

Low level signal processing includes, without limitation, acquiring and accessing health of data. High level signal processing and validation includes, without limitation, radiometric work to exclude data impurities, e.g., soot measurement rejections, comparing signals, blending signals, computing quality indices on signals, and computing status flags to indicate pyrometer health. Signal conditioning includes, without limitation, filtering and compensating for known thermal effects. Further features may include communicating selected signal values, health indicators, and signal quality indicators to gas turbine controller 176 along with some form of error detection and/or correction algorithm to ensure controller 176 is receiving the data correctly. Additional features may include gas turbine controller 176 reading provided information and using or choosing data back-up methods based on information provided.

Also, smart signals 634 are transmitted 318 to gas turbine controller 176 to facilitate control of actuators 106 to operate gas turbine engine 100 based upon the signals received.

The above-described optical sensor system provides a cost-effective method for increasing reliability and decreasing disruptions of operation of gas turbine engines. Specifically, the devices, systems, and methods described herein distinguish between temperature signals generated by the transient presence of soot particles and temperature signals substantially representative of component temperatures in the hot gas path of a gas turbine engine. The devices, systems, and methods described herein determine an apparent emissivity of the hot gas path components and use such determinations in comparison with determinations of emissivity of soot particles to distinguish between transient soot particles and component temperatures. These determinations reduce temperature signal bursts due to transient soot particle interference being transmitted to gas turbine engine controllers that includes component temperature monitoring features. Reducing such signal bursts to the controllers reduces firing rate oscillations and automatic protective actions induced by transient soot particle interference with component temperature monitoring. Such determinations may be performed in real time using processing speeds at or in excess of 1 MHz, or, may be slowed down for compatibility in mature gas turbine engine retrofits.

Also, the devices, systems, and methods described use an optical temperature measurement system to discriminate between temperature signals generated by the transient presence of soot particles and temperature signals substantially representative of component temperatures. The optical temperature measurement system includes a multi-color pyrometer system to filter the temperature signals as a function of the wavelengths of the associated photons and the difference between emissivity of the soot particulates and the components. A significant portion of the optical temperature measurement system may be implemented in a smart pyrometer architecture, thereby reducing costs associated with retrofitting/upgrading the gas turbine engine controllers.

An exemplary technical effect of the methods, systems, and apparatus described herein includes at least one of (a) enabling an optical temperature measurement system to distinguish between temperature signals generated by the transient presence of soot particles and temperature signals substantially representative of component temperatures in the hot gas path of a gas turbine; (b) enabling determinations of an apparent emissivity of the hot gas path components and using such determinations to distinguish between transient soot particles and component temperatures; (c) enabling a reduction in temperature signal bursts due to transient soot particle interference with component temperature monitoring; (d) facilitating a reduction in firing rate oscillations induced by transient soot particle interference with component temperature monitoring; (e) facilitating a reduction in automatic protective actions induced by transient soot particle interference with component temperature monitoring; and (f) enabling an optical temperature measurement system to discriminate between temperature signals generated by the transient presence of soot particles and temperature signals substantially representative of component temperatures by using a multi-color pyrometer system to filter the temperature signals as a function of the wavelengths of the associated photons and the difference between emissivity of the soot particulates and the components.

Exemplary embodiments of optical sensor systems for gas turbine engines and methods for operating are described above in detail. The optical sensor systems and methods of operating such systems are not limited to the specific embodiments described herein, but rather, components of systems and/or steps of the methods may be utilized independently and separately from other components and/or steps described herein. For example, the methods may also be used in combination with other high temperature combustion systems and methods, and are not limited to practice with only the gas turbine systems and optical sensor systems and methods as described herein. Rather, the exemplary embodiment can be implemented and utilized in connection with many other high temperature combustion applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical sensor system comprising:
at least one multi-color pyrometer in optical communication with at least one component, said at least one multi-color pyrometer configured to generate signals at least partially representative of radiation received from the at least one component and at least partially representative of radiation received from soot particles; and at least one processing unit coupled to said at least one multi-color pyrometer, said at least one processing unit programmed to:

receive the signals generated in said at least one multi-color pyrometer;

distinguish portions of radiation received by said at least one multi-color pyrometer between at least two wavelength bands;

determine that a first portion of radiation within a first of the at least two wavelength bands is representative of a temperature of soot particles;

determine that a second portion of radiation within a second of the at least two wavelength bands is representative of a temperature of the at least one component; and filter out signals representative of the first portion of the radiation.

2. A system in accordance with claim 1, wherein the at least two wavelength bands comprises wavelength bands centered about approximately 1,064 nanometers (nm), 1,600 nm, and 2,200 nm.

3. A system in accordance with claim 1, wherein said at least one processing unit is further programmed to distinguish between voltage amplitudes representative of temperature spikes due to soot particles and voltage amplitudes representative of temperatures of the at least one component.

4. A system in accordance with claim 1, wherein said at least one processing unit is further programmed to distinguish between an emissivity of the soot particles and an apparent emissivity of the at least one component.

5. A system in accordance with claim 1, wherein said at least one processing unit is further programmed to determine a spectral emissivity of soot particles as a function of at least one of a temperature of the soot particles, a wavelength of radiation emitted from the soot particles, a volume fraction of the soot particles, and a layer thickness of the soot particles.

6. A system in accordance with claim 5, wherein said at least one processing unit is further programmed to filter out signals representative of the radiation emitted from the soot particles by filtering out signals below a predetermined emissivity value.

7. A system in accordance with claim 1, wherein said at least one processing unit is coupled to a gas turbine engine controller, said at least one processing unit is further programmed to transmit signals substantially representative of a temperature of the at least one component to the gas turbine engine controller, wherein portions of the signals representative of soot particles are substantially removed.

8. A method for operating a gas turbine engine, said method comprising:

channeling a combustion gas stream through a hot gas path of the gas turbine engine, the combustion gas stream includes soot particles entrained therein, the hot gas path includes at least one turbine component;

receiving radiative emissions from at least a portion of the soot particles in at least one multi-color pyrometer;

receiving radiative emissions from the at least one turbine component in the at least one multi-color pyrometer;

generating signals representative of temperatures of both the soot particles and the at least one turbine component in the at least one multi-color pyrometer;

discriminating between a portion of the signals generated by the soot particles and a portion of the signals generated by the at least one turbine component; and determining a temperature of the at least one turbine component.

9. A method in accordance with claim 8, wherein generating signals representative of temperatures of both the soot particles and the at least one turbine component comprises:

channeling a stream of photons emitted from the soot particles and the at least one turbine component to the at least one multi-color pyrometer; and generating signals within the at least one multi-color pyrometer representative of a first range of wavelengths of the stream of photons.

10. A method in accordance with claim 9, wherein discriminating between a portion of the signals comprises splitting the signals representative of a first range of wavelengths of the stream of photons such that signals representative of a plurality of second ranges of wavelengths are transmitted from the at least one multi-color pyrometer, wherein the plurality of second ranges of wavelengths are within the first range of wavelengths.

11. A method in accordance with claim 10, wherein splitting the signals further comprises discriminating between a first plurality of signals having voltage amplitudes representative of the soot particles from a second plurality of signals having voltage amplitudes representative of the at least one turbine component.

12. A method in accordance with claim 11, wherein discriminating comprises determining an emissivity of the soot particles.

13. A method in accordance with claim 12, wherein determining an emissivity of the soot particles comprises determining a spectral emissivity of the soot particles as a function of at least one of a temperature of the soot particles, a wavelength of radiation emitted from the soot particles, a volume fraction of the soot particles, and a layer thickness of the soot particles.

14. A method in accordance with claim 13, wherein discriminating further comprises determining an apparent emissivity of the at least one turbine component.

15. A method in accordance with claim 14, wherein determining an apparent emissivity of the at least one turbine component comprises filtering signals representative of a first range of wavelengths of the radiative emissions such that signals representative of a plurality of second ranges of wavelengths are transmitted from the at least one multi-color pyrometer, wherein the second ranges of wavelengths are within the first range of wavelengths, and values of spectral absorptance of the combustion gas stream within the second ranges of wavelengths is below a predetermined value.

16. A gas turbine engine comprising:

at least one component positioned within a hot gas path defined within said gas turbine engine;

at least one multi-color pyrometer in optical communication with said at least one component, said at least one multi-color pyrometer configured to generate signals at least partially representative of radiation received from the at least one component and at least partially representative of radiation received from soot particles; and at least one processing unit coupled to said at least one multi-color pyrometer, said at least one processing unit programmed to:

receive the signals generated in said at least one multi-color pyrometer;

distinguish portions of radiation received by said at least one multi-color pyrometer between at least two wavelength bands;

determine that a first portion of radiation within a first of the at least two wavelengths is representative of a temperature of soot particles;

determine that a second portion of radiation within a second of the at least two wavelength bands is representative of a temperature of the at least one component; and filter out signals representative of the first portion of the radiation.

17. A gas turbine engine in accordance with claim 16, wherein said at least one processing unit is further programmed to distinguish between voltage amplitudes representative of temperature spikes due to soot particles and voltage amplitudes representative of temperatures of said at least one component.

18. A gas turbine engine in accordance with claim 16, wherein said processing unit is further programmed to distinguish between an emissivity of the soot particles and an apparent emissivity of said at least one component.

19. A gas turbine engine in accordance with claim 16, wherein said processing unit is further programmed to:

determine a spectral emissivity of soot particles as a function of at least one of a temperature of the soot particles, a wavelength of radiation emitted from the soot particles, a volume fraction of the soot particles, and a layer thickness of the soot particles; and filter out signals representative of the radiation emitted from the soot particles by filtering out signals below a predetermined emissivity value.

20. A gas turbine engine in accordance with claim 16, wherein said at least one processing unit is coupled to a gas turbine engine controller, said at least one processing unit is further programmed to transmit signals substantially representative of a temperature of said at least one component to said gas turbine engine controller, wherein portions of the signals representative of soot particles are substantially removed.

* * * * *